April 8, 1952 C. B. STAIR 2,592,485
CONTAINER AND MIXER FOR BEVERAGES
Filed April 24, 1950

INVENTOR.
CARLYLE B. STAIR
BY
HIS ATTORNEY

Patented Apr. 8, 1952

2,592,485

UNITED STATES PATENT OFFICE 2,592,485

CONTAINER AND MIXER FOR BEVERAGES

Carlyle B. Stair, Glendale, Calif., assignor to Prestige Products, Inc., Beverly Hills, Calif., a corporation of California Application April 24, 1950, Serial No. 157,782

5 Claims. (Cl. 259—72)

This invention relates to a combined container and mixer for fluids and particularly to a form thereof adapted for preparing frozen, condensed fruit juices for beverage purposes.

Condensed and frozen fruit juices (particularly orange juice) have recently become an important food item, but the preparation of such juices for beverage purposes has been left to the housewife to accomplish in any way that was found convenient. The frozen, condensed juice is sold in cans and the accompanying directions are to extract the frozen mass from the can, place it in a container, add three cans full of water and stir until the mass is dissolved. Such of the beverage as is not used must be stored in the refrigerator in an airtight container. When thus stored, the fluid and solid matter will separate and, therefore the mixture must be stirred or otherwise agitated before it is served.

With these considerations in mind, it is an object of the present invention to provide a combined storage container and mixer adapted to facilitate the preparation of beverages from frozen, condensed fruit juices.

Another object of the invention is to provide a container of the above type having internal means constructed and arranged to facilitate the breaking up of the frozen mass of fruit juice with resultant economy of time and effort in the preparation of a beverage therefrom.

Another object of the invention is to provide a container and mixer in which the foregoing objectives are realized and which is susceptible of economical manufacture, is easy to keep clean, and which is also adapted for the storage of fluids generally.

Figure 1:
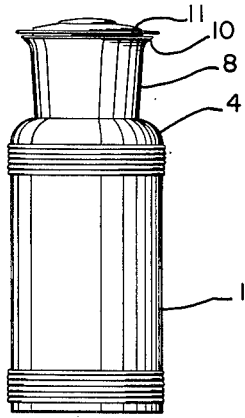
Figure 2:
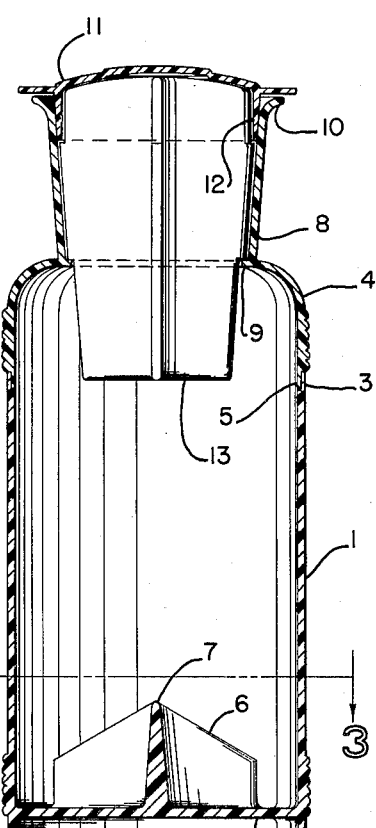
Figure 4:
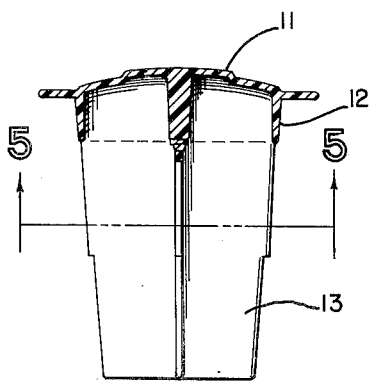
Figure 5:
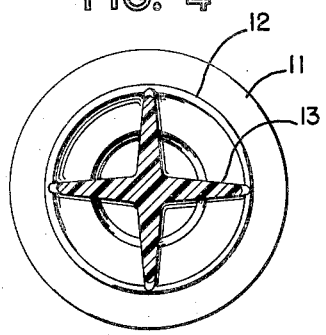
Figure 3:
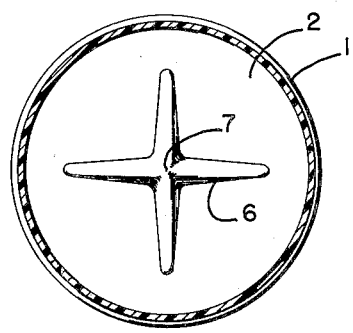

With the above objects in view, together with such other objects and advantages as may subsequently appear, the invention resides in the parts, and in the construction, combination, and arrangement of parts described, by way of example, in the following specification; reference being had to the accompanying drawings which form a part of said specification and in which:

Fig. 1 is a side elevation of a mixing and storage container embodying the invention, Fig. 2 is an enlarged, vertical, medial sectional view of the container shown in Fig. 1; a removable part thereof being shown in full lines, Fig. 3 is a transverse, sectional view taken on the line 3—3 of Fig. 2, Fig. 4 is a side elevation, partly in section, of a modified form of stopper or cover for the container, and Fig. 5 is a transverse, sectional view taken on the line 5—5 of Fig. 4.

The illustrated form of the invention comprises a bottle-like container, preferably formed of molded plastic and includes a combined side wall 1 and bottom 2; said side wall at the edge remote from the bottom having been recessed to form a counterbore 3, and a combined top and neck portion 4 having a depending skirt portion 5 which fits the counterbore 3 and is cemented or otherwise secured therein so as to provide a smooth interior surface for the container. Formed integrally with the bottom portion 1 and rising therefrom within the container is a multi-vaned member (here shown as cruciform in cross section) 6 which is of less diameter than the interior of the container and which at its upper or free end tapers upwardly along each vane to a central point 7 which assists in breaking up the mass of frozen juice concentrate.

The combined top and neck portion 4 at the juncture of the neck 8 with the top of the container is provided with an inwardly extending, annular shoulder 9 and the neck portion 8 tapers outwardly and upwardly from this shoulder and terminates in a flared top edge 10 which serves as a pouring lip. The cover 11 is provided with an inwardly tapering, depending skirt portion 12 which frictionally engages the interior of the neck 9 to form an air and fluid tight seal.

Seated on the shoulder 9 and extending downwardly into the upper portion of the container is a multi-vaned mixing member 13 the upper end of which extends to the top of the neck 8 for engagement by the cover 8 as shown in Fig. 2. It is shown as a four vaned member, but may have three or more vanes as desired. This member may also be formed as an integral part of the cover as shown in Figs. 4 and 5 instead of being a separate element in which case it will not rest on the shoulder 9 but will clear that shoulder slightly so as not to interfere with the tight sealing by the cover.

In use, the cover and mixing member are removed from the container and a can of frozen, condensed fruit juice from which the top has been removed is inverted and seated on the shoulder 9; the diameter of the neck and shoulder being such as to accommodate the standard can for that product. When the surface of the frozen mass has thawed slightly, the mass will drop into the container. The can is removed and the container filled with water up to the level of the shoulder 9 which adds the proper amount without the necessity of measuring out three cans full of water. The cover and mixing member are then replaced and the container is given a vigorous shaking during which time the members 6 and 13 will tend to break up the mass and thus speed up the thawing action and the time required for preparation of the beverage. If the amount prepared is not used at one time the container can be stored in a refrigerator and the air tight seal provided by the cover will assist in keeping the contents from loss of flavor. When stored, the prepared juice will tend to separate and must be stirred before use. With the present container and the associated mixing devices, it is possible to do this by merely shaking the container.

The device is a time saver in that the housewife need not wait for the frozen mass to drop out of the can but she can attend to other matters while waiting and the necessity for the measuring out of three cans full of water but need merely fill the container. Further, the container in which the juice is prepared is also the storage container and it is the means for re-mixing the contents after such storage.

The container and its component parts are all of simple design and susceptible of economical manufacture and additionally, the device is easy to maintain in a sanitary condition.

While I have described and illustrated certain embodiments of my invention, I do intend to limit myself to the exact forms disclosed, and it is to be understood that the invention embraces all such modifications in the parts and the construction, combination and arrangement of parts as shall come within the purview of the appended claims.

I claim:

1. A combined container and mixer for preparing beverages from frozen, condensed fruit juices and other concentrates, including a bottle like container comprising a bottom wall, a side wall, and a neck portion, an inwardly projecting annular ledge disposed at the juncture of said neck portion with said side wall, a removable, multi-vaned mixing element on said ledge and projecting therefrom into the interior of said container and a removable cover adapted to have frictional engagement with said neck portion.

2. A combined container and mixer for preparing beverages from frozen, condensed fruit juices and other concentrates, including a bottle like container comprising a bottom wall having an integrally formed multi-vaned mixing element projecting into the interior of the container, a side wall, and a neck portion, an inwardly projecting ledge disposed at the juncture of said neck portion with said side wall, a removable, multi-vaned mixing element seated on said ledge and projecting therefrom into the interior of said container, and a removable cover engageable with said neck to close said container and simultaneously effective to hold said removable mixing element seated on said ledge.

3. A combined container and mixer for preparing beverages from frozen, condensed juices and other concentrates including a bottle like container comprising a bottom wall having an intergrally formed multi-vaned mixing element projecting upwardly therefrom into the container and terminating in a point adapted to facilitate the shattering of a frozen mass of juice concentrate, a side wall, and a neck portion, an inwardly projecting, annular ledge disposed at the juncture of said neck portion with said side wall, a removable mixing element mounted on said ledge and extending therefrom into the interior of said container, and a removable cover adapted to engage said neck portion to close said container and additionally adapted to engage said removable mixing element and thereby hold it seated on said ledge.

4. A combined container and mixer for preparing beverages from frozen, condensed fruit juices and other concentrates, including a bottle like container comprising a bottom wall having an integrally formed, multi-vaned mixing element projecting upwardly therefrom into the interior of the container, a side wall, and a neck portion at the end of said side wall remote from said bottom wall, and a removable cover element engageable with said neck portion to close said container; said cover having an integrally formed, multi-vaned mixing element adapted to extend from said cover through said neck portion and into the interior of said container effective to facilitate the shattering of a mass of frozen juice concentrate.

5. A combined container and mixer for preparing beverages from frozen, condensed fruit juices and other concentrates, comprising a bottle like container having a bottom wall provided with an upwardly projecting multi-vaned mixing element terminating at a common juncture point of the vanes to form a pointed end, a side wall, a neck portion, an inwardly projecting ledge disposed at the juncture of said side wall and said neck portion, and a cover adapted to engage said neck portion; said cover having an integrally formed, multi-vaned mixing element adapted to extend from said cover through said neck portion into the interior of said container; both of said multi-vaned mixing elements being effective to facilitate the shattering of a frozen mass of juice concentrate.

CARLYLE B. STAIR.

REFERENCES CITED

The following references are of record in the file of this patent:

UNITED STATES PATENTS

| Number | Name | Date |
|---|---|---|
| 300,867 | Hauck | June 24, 1884 |
| 1,075,119 | Reichner | Oct. 7, 1913 |
| 2,118,306 | Hornbostel | May 24, 1938 |
| 2,208,431 | Rochow | July 16, 1940 |